US010540049B2

(12) United States Patent
Kwak et al.

(10) Patent No.: US 10,540,049 B2
(45) Date of Patent: Jan. 21, 2020

(54) DISPLAY DEVICE AND METHOD OF FABRICATING THE SAME

(71) Applicant: Samsung Display Co., Ltd., Yongin-si (KR)

(72) Inventors: Nayun Kwak, Cheonan-si (KR); Hwa-Jeong Kim, Hwaseong-si (KR); Sanghyun Jun, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/553,340

(22) Filed: Aug. 28, 2019

(65) Prior Publication Data

US 2019/0384430 A1 Dec. 19, 2019

Related U.S. Application Data

(63) Continuation of application No. 16/375,812, filed on Apr. 4, 2019, now Pat. No. 10,430,010, which is a (Continued)

(30) Foreign Application Priority Data

Jun. 21, 2017 (KR) ........................ 10-2017-0078739

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0412* (2013.01);
(Continued)

(58) Field of Classification Search
None
See application file for complete search history.

(56) References Cited

U.S. PATENT DOCUMENTS 9,459,750 B2  10/2016 Han et al.
9,459,751 B2  10/2016 Weaver et al.
(Continued)

FOREIGN PATENT DOCUMENTS

KR  10-2016-0001482  1/2016
KR  10-2016-0029268  3/2016
(Continued)

OTHER PUBLICATIONS

Non-Final Office Action dated Aug. 30, 2018, issued in U.S. Appl. No. 15/909,994.
(Continued)

*Primary Examiner* — Nicholas J Lee
(74) *Attorney, Agent, or Firm* — H.C. Park & Associates, PLC

(57) ABSTRACT

A display device, includes: a display panel including a display region defined therein; and an input sensing layer disposed on the display panel, including: a first sensing electrode including a first sub-electrode and a second sub-electrode disposed on the first sub-electrode; a second sensing electrode spaced apart from the first sensing electrode in a first direction, including a third sub-electrode and a fourth sub-electrode disposed on the third sub-electrode; a first sensing wire electrically connected to the first sensing electrode; and a second sensing wire electrically connected to the second sensing electrode, wherein a width of the first sub-electrode in a second direction intersecting with the first direction is greater than a width of the third sub-electrode in the second direction, and wherein a width of the second sub-electrode in the second direction is smaller than a width of the fourth sub-electrode in the second direction.

12 Claims, 12 Drawing Sheets

Related U.S. Application Data continuation of application No. 15/909,994, filed on Mar. 1, 2018, now Pat. No. 10,275,106.

(52) U.S. Cl.
CPC .............. *G06F 2203/04103* (2013.01); *G06F 2203/04111* (2013.01); *G06F 2203/04112* (2013.01)

(56) References Cited

U.S. PATENT DOCUMENTS

| | | |
|---|---|---|
| 9,671,886 B2 | 6/2017 | Yoo et al. |
| 9,753,576 B2 | 9/2017 | Kim et al. |
| 2013/0257785 A1 | 10/2013 | Brown et al. |
| 2013/0257786 A1 | 10/2013 | Brown et al. |
| 2015/0205418 A1 | 7/2015 | Nam et al. |
| 2015/0287381 A1 | 10/2015 | Kim et al. |
| 2016/0103547 A1 | 4/2016 | Lu et al. |
| 2016/0306475 A1 | 10/2016 | Cho et al. |
| 2016/0320876 A1 | 11/2016 | Son et al. |
| 2017/0045973 A1 | 2/2017 | Chou et al. |

FOREIGN PATENT DOCUMENTS

| | | |
|---|---|---|
| KR | 10-2016-0073533 | 6/2016 |
| KR | 10-2016-0124987 | 10/2016 |
| KR | 10-2016-0130056 | 11/2016 |

OTHER PUBLICATIONS

Notice of Allowance dated Dec. 20, 2018, issued in U.S. Appl. No. 15/909.994.

Notice of Allowance dated May 9, 2019, issued in U.S. Appl. No. 16/375,812.

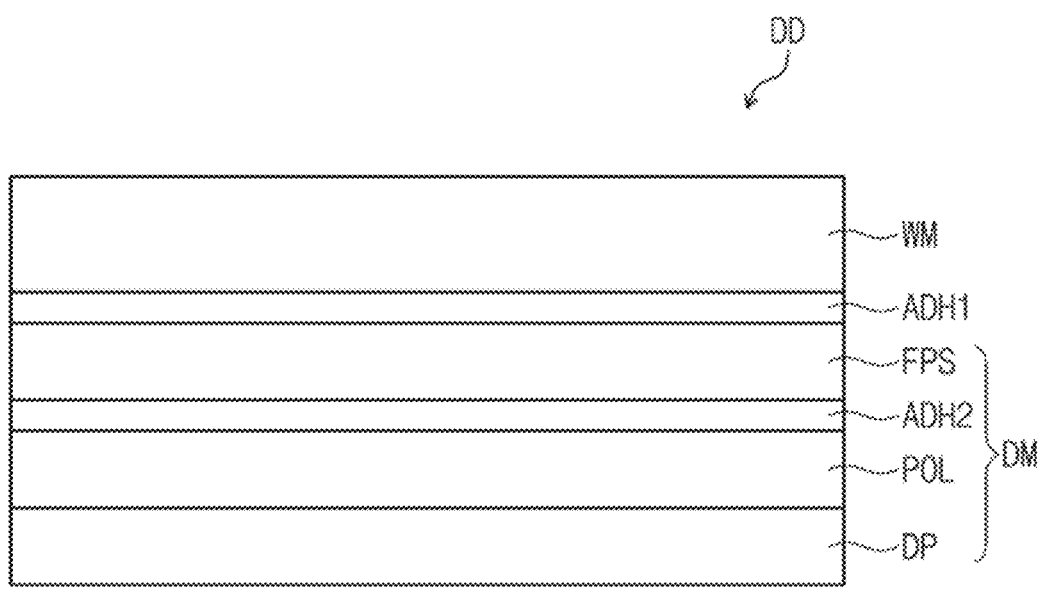

DISPLAY DEVICE AND METHOD OF FABRICATING THE SAME

CROSS-REFERENCE TO RELATED APPLICATION

This application is a Continuation Application of U.S. patent application Ser. No. 16/375,812, filed on Apr. 4, 2019, which is a Continuation Application of U.S. patent application Ser. No. 15/909,994, filed on Mar. 1, 2018, now issued as U.S. Pat. No. 10,275,106, and claims priority from and the benefit of Korean Patent Application No. 10-2017-0078739, filed on Jun. 21, 2017, which are hereby incorporated by reference for all purposes as if fully set forth herein.

BACKGROUND

Field

Exemplary embodiments relate to a display device and a method of fabricating the same, and in particular to a display device including touch electrodes, and a method of fabricating the same.

Discussion of the Background

A touch screen panel is an input device, allowing for a user to select elements displayed on a screen and to input a user command using a hand or an object.

The touch screen panel is often provided on a front face of an image display device and is configured to sense a touch event provided from a hand or an object and to generate an electrical signal containing position information of the touch event. An electrical signal or content generated by the touch event is used as an input signal in the image display device.

The touch screen panel is used to replace an additional input device (e.g., a keyboard and a mouse), which is connected to the image display device. Thus, the application range of the touch screen panel is gradually expanding.

There are a variety of technologies to realize such a touch screen panel. For example, a method of using a resistive layer, an optical sensing method, and a capacitance sensing method are being used to realize such touch screen panels. In particular, for the capacitance sensing method, the touch screen panel is configured to measure a change in electrostatic capacitance between a conductive sensing pattern and another sensing pattern (or a ground electrode), which may occur when a hand or an object is in contact with the touch screen panel, and to convert the measured result to an electrical signal containing information on a contact position.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments of the inventive concepts provide a display device including touch electrodes having increased consistency in electrostatic capacitance, and a method of fabricating the same.

Additional aspects will be set forth in the detailed description which follows, and, in part, will be apparent from the disclosure, or may be learned by practice of the inventive concepts.

According to exemplary embodiments, a display device may include a substrate including a display region and a non-display region outside the display region, a circuit layer provided on the substrate, a device layer provided on the display region, an encapsulation layer provided to cover the device layer, and a touch layer provided on the encapsulation layer. The touch layer may include touch patterns, an insulating layer, and touch electrodes provided on the touch patterns. The touch electrodes may be electrically connected to the touch patterns, respectively, through contact holes formed in the insulating layer. Touch patterns may include first sub-patterns extending in a first direction and second sub-patterns extending from the first sub-patterns in a second direction crossing the first direction. When viewed in a plan view, areas of the touch electrodes may gradually decrease in the first direction, and areas of the second sub-patterns may gradually increase in the first direction.

Each of the touch electrodes may be a transparent electrode. Each of the touch electrodes may include at least one of indium tin oxide (ITO), indium zinc oxide (IZO), zinc oxide (ZnO), and/or indium tin zinc oxide (ITZO).

The display device may further include dummy electrodes provided on the insulating layer, the dummy electrodes being disposed spaced apart from the touch electrodes.

The dummy electrodes may include the same material as the touch electrodes.

The display device may further include dummy electrodes provided between two adjacent touch electrodes of the touch electrodes.

The dummy electrodes may be provided on the same layer as that of the touch electrodes.

The touch electrodes may be configured to be capacitively coupled with an external object.

The device layer may include pixels, the pixels being configured to display an image, and the second sub-patterns may be spaced apart from the pixels and may include a mesh-shaped portion provided between the pixels.

The display device may further include a touch driving part configured to generate touch driving signals for driving the touch patterns. The first sub-patterns may be configured to transmit the touch driving signals to the second sub-patterns from the touch driving part.

According to some embodiments, a method of fabricating a display device may include providing a substrate including a display region and a peripheral region outside the display region, disposing a circuit layer on the substrate, disposing a device layer on the display region, disposing an encapsulation layer to cover the device layer, and disposing a touch layer on the encapsulation layer. The disposing of the touch layer may include disposing touch patterns, disposing an insulating layer to cover the touch patterns, forming contact holes in the insulating layer to expose at least a portion of the touch patterns, and disposing touch electrodes on the touch patterns. Here, the touch electrodes may be respectively connected to the touch patterns through the contact holes. The disposing of the touch electrodes may include: disposing first sub-patterns extending in a first direction and disposing second sub-patterns extending from the first sub-patterns in a second direction crossing the first direction. When viewed in a plan view, areas of the touch electrodes may gradually decrease in the first direction, and areas of the second sub-patterns may gradually increase in the first direction.

Each of the touch electrodes may be a transparent electrode.

Each of the touch electrodes may include at least one of indium tin oxide (ITO), indium zinc oxide (IZO), zinc oxide (ZnO), and/or indium tin zinc oxide (ITZO).

The method may further include forming dummy electrodes on the insulating layer, the dummy electrodes are disposed spaced apart from the touch electrodes.

The dummy electrodes may include the same material as the touch electrodes.

The method may further include forming dummy electrodes between two adjacent touch electrodes of the touch electrodes.

The dummy electrodes may be formed on the same layer as that of the touch electrodes.

The touch electrodes may be formed to be capacitively coupled with an external object.

The device layer may include pixels, the pixels being configured to display an image, and the disposing of the second sub-patterns may include forming the second sub-patterns between the pixels to be spaced apart from the pixels.

According to some embodiments, a display device may include a substrate including a display region and a non-display region outside the display region, a circuit layer provided on the substrate, a device layer provided on the display region, an encapsulation layer provided to cover the device layer, and a touch layer provided on the encapsulation layer. The touch layer may include touch patterns and touch electrodes provided on the touch patterns, the touch electrodes respectively connected to the touch patterns.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 2 is a sectional view illustrating a portion of the display device of FIG. 1.

Figure 1A:
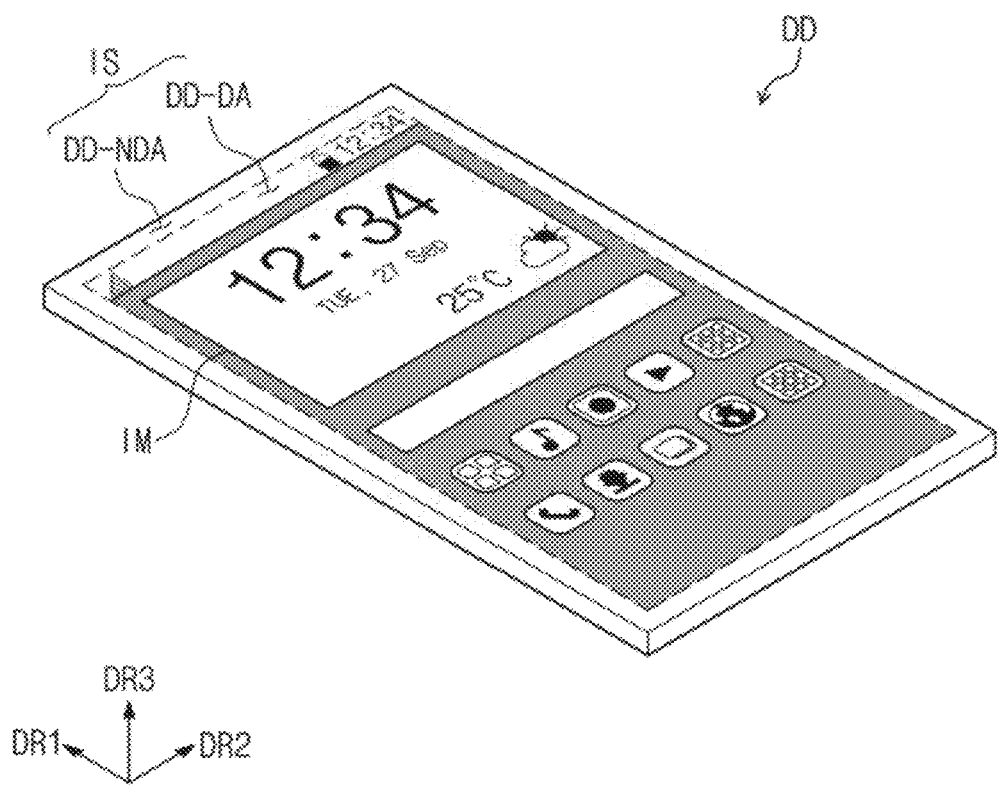
FIG. 1A is a perspective view of a display device according to an exemplary embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not necessarily intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
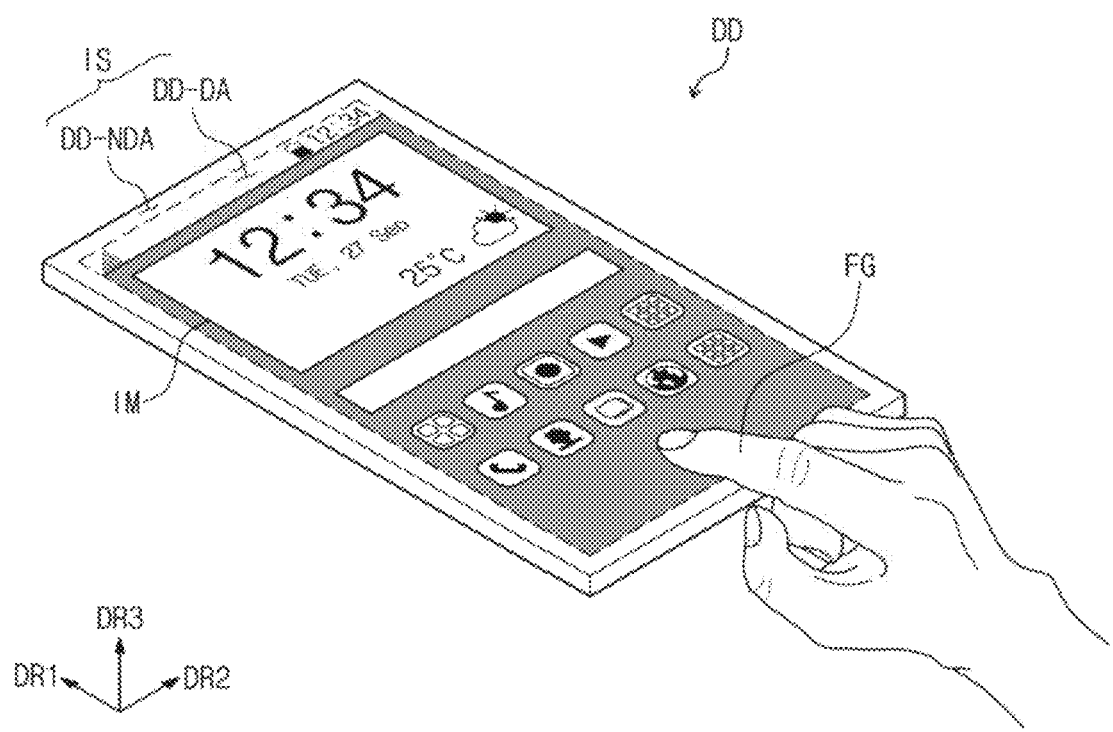
FIG. 1B is a perspective view of the display device of FIG. 1A, illustrating a user's finger is in contact with the display device, according to an exemplary embodiment.

FIG. 1A is a perspective view of a display device DD according to an exemplary embodiment. FIG. 1B is a perspective view of the display device DD of FIG. 1A, illustrating a user's finger FG in contact with the display device, according to the exemplary embodiment.

The display device DD may include a display surface IS on which an image IM is disposed, and the display surface may be defined to be parallel to both of a first direction axis DR1 and a second direction axis DR2. Hereinafter, a third direction axis DR3 will be used to refer to a normal direction of the display surface IS (i.e., a thickness direction of the display device DD). A front or a front face (or a top surface) and a rear face (or bottom surface) of each member may be distinguished, based on the third direction axis DR3. However, directions indicated by the first, second, and third direction axes DR1, DR2, and DR3 may be relative concepts, and in certain exemplary embodiments, they may be changed to indicate other directions. Hereinafter, first, second, and third directions may be directions indicated by the first, second, and third direction axes DR1, DR2, and DR3, respectively, and will be identified with the same reference numbers.

The display device DD may be used for large-sized electronic devices (e.g., television sets and monitors) or small-sized or medium-sized electronic devices (e.g., smart phones, tablets, car navigation systems, game machines, and smart watches). For the sake of simplicity, the following description will refer to an exemplary embodiment of the display device DD which is a smart phone.

Referring to FIG. 1A, the display surface IS may include a display region DD-DA, which is used to display the image IM, and a non-display region DD-NDA, which is provided adjacent to the display region DD-DA. The non-display region DD-NDA may be configured not to display any image. As shown FIGS. 1A and 1B, application icons may be displayed as parts of the image IM. In exemplary embodiments, the display region DD-DA may have a rectangular shape. The non-display region DD-NDA may surround the display region DD-DA. However, the exemplary embodiments are not limited thereto, and the shapes of the display and non-display regions DD-DA and DD-NDA may be variously changed in the substantially similar manner.

Referring to FIG. 1B, the display device DD may be configured to detect a touch event caused by the finger FG. In exemplary embodiments, a region, at which the touch event can be detected, may be substantially the same as the display region DD-DA. In other words, in the case where the finger FG is in contact with the display region DD-DA, it may be possible to recognize the touch event, which is caused by the finger FG, using the display device DD.

FIG. 2 is a sectional view illustrating a portion of the display device DD of FIG. 1.

The display device DD may include a window WM and a display module DM. The window WM and the display module DM may be attached to each other by a first adhesive layer ADH1.

The display module DM may include a touch layer FPS, a display panel DP, and an anti-reflection structure POL. The touch layer FPS and the display panel DP may be attached to each other by a second adhesive layer ADH2.

Each of the first adhesive layer ADH1 and the second adhesive layer ADH2 may include an optically clear adhesive (OCA) film, an optically clear resin (OCR), and/or a pressure sensitive adhesive (PSA) film. In exemplary embodiments, each of the first adhesive layer ADH1 and the second adhesive layer ADH2 may include a photo-curable adhesive material and/or a heat-curable adhesive material, but the exemplary embodiments are not limited to the specific material thereof.

The window WM may be configured to protect the display module DM from an external impact and provide a touch sensing surface to a user. The display surface IS shown in FIGS. 1A and 1B may be used as the touch sensing surface. In addition, the display surface IS may be used as a fingerprint-recognizing surface for recognizing a user's fingerprint.

The window WM may include glass. But the exemplary embodiments are not limited thereto, and for example, in certain embodiments, the window WM may include at least one of optically transparent materials.

The display panel DP may include a plurality of light-emitting devices. If image data is input to the display device DD, the display panel DP may display the image IM (e.g., see FIG. 1A) based on the image data. A process of fabricating the display panel DP may include a low temperature polycrystalline silicon (LTPS) and/or low temperature polycrystalline oxide (LTPO) process.

The touch layer FPS may be provided on the display panel DP. The touch layer FPS may be configured to obtain coordinate information on a position of an external input, e.g. a touch event by an external object. In exemplary embodiments, the touch layer FPS may be independently fabricated by an additional process and may be attached to the display panel DP. But the exemplary embodiments are not limited thereto, and in certain embodiments, the touch layer FPS may be directly provided on a surface of the display panel DP. In other words, the touch layer FPS and the display panel DP may be fabricated through a successive process. Here, the touch layer FPS may be coupled to the display panel DP without using the second adhesive layer ADH2.

The touch layer FPS may include a plurality of touch electrodes, which are used to detect whether there is a touch event caused by an external object. The external object may be the finger FG shown in FIG. 1B. The finger FG may be capacitively coupled with the touch layer FPS, thereby causing a change in electrostatic capacitance of the touch layer FPS.

The anti-reflection structure POL may be provided between the display panel DP and the touch layer FPS. The anti-reflection structure POL may be configured to absorb light incident from the outside or to reduce optical reflectance of the light through destructive interference or polarization of the light.

In exemplary embodiments, the anti-reflection structure POL may include a color filter, a stack of conductive layer/dielectric layer/conductive layer, a polarizer, and/or an optical component.

Figure 3:
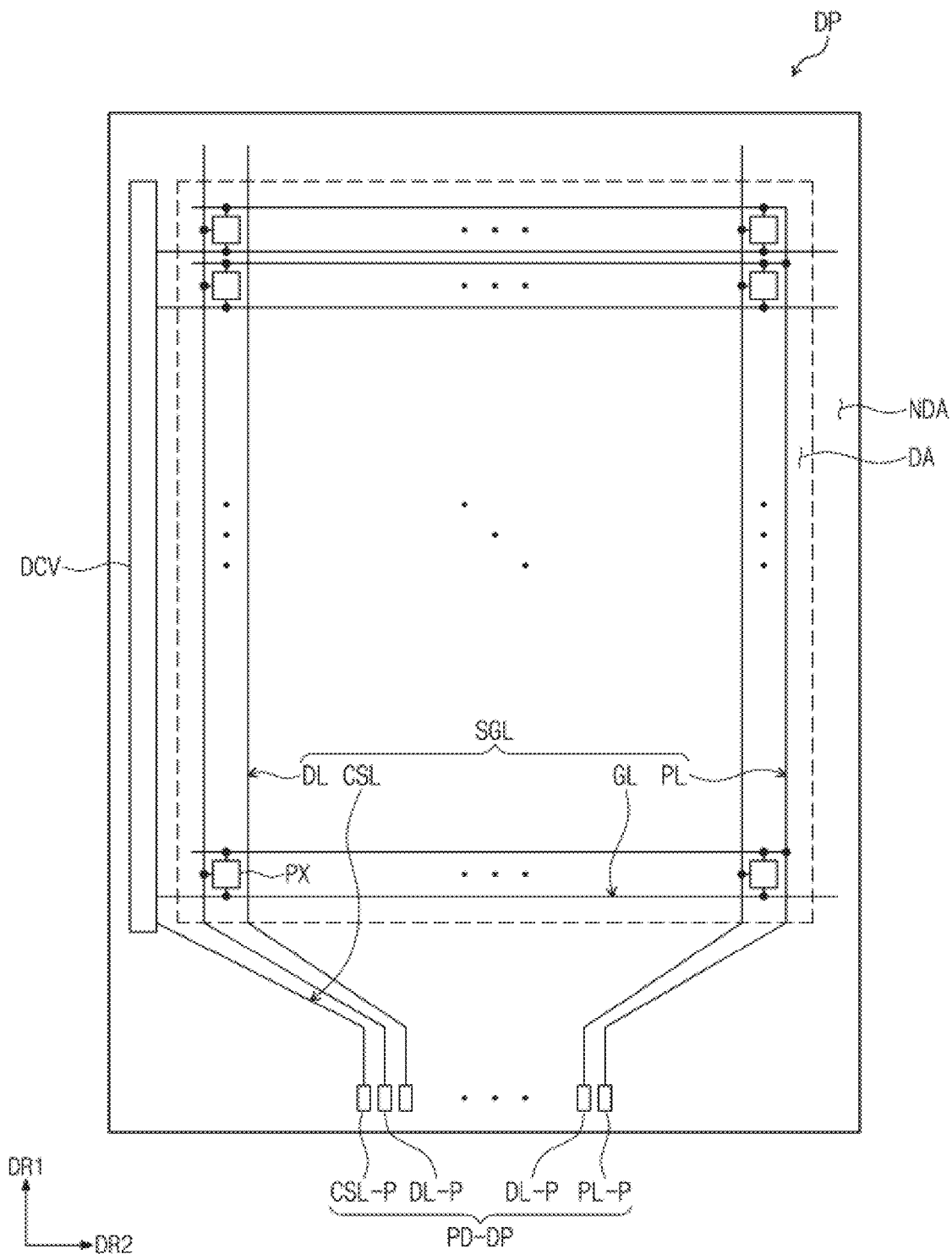
FIG. 3 is a plan view of a display panel according to an exemplary embodiment.
Figure 4:
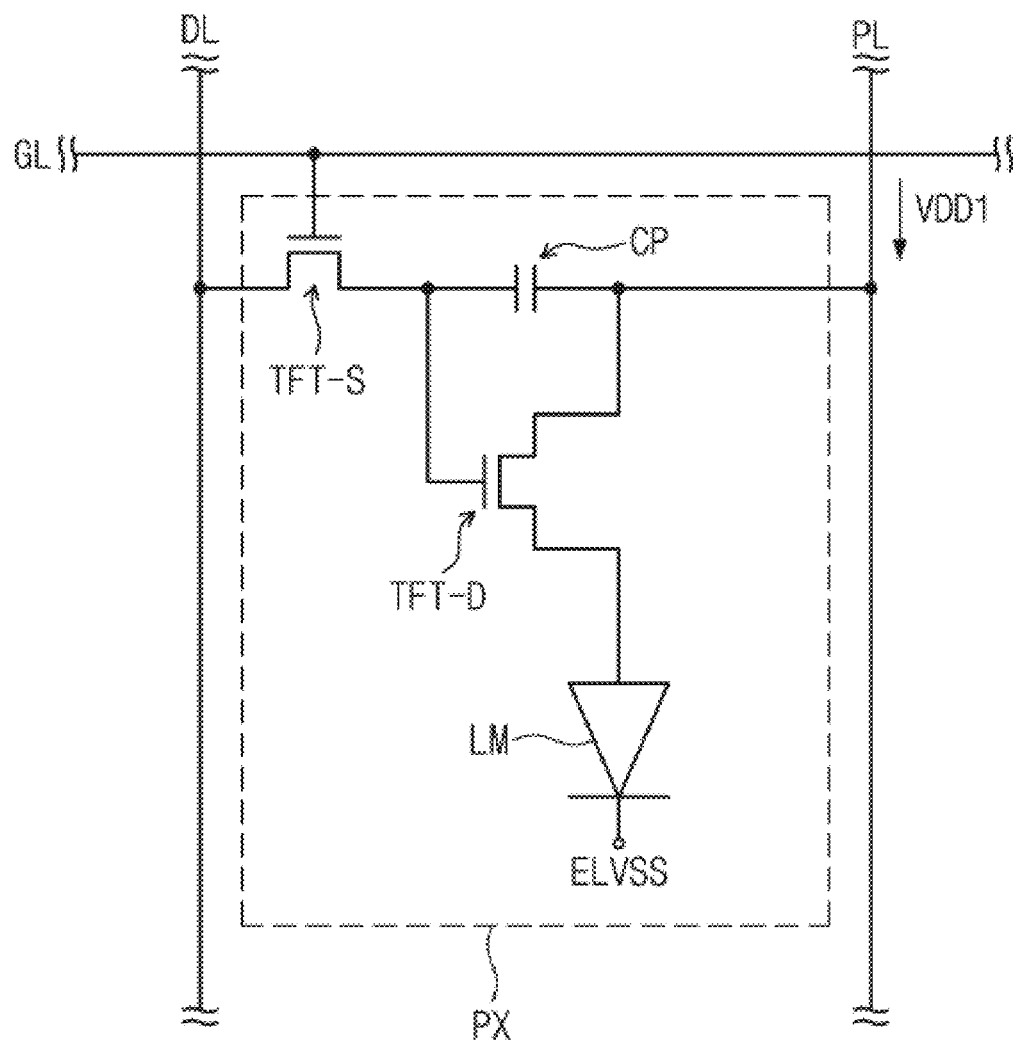
FIG. 4 is an equivalent circuit diagram of a pixel according to an exemplary embodiment.

FIG. 3 is a plan view of the display panel DP according to an exemplary embodiment. FIG. 4 is an equivalent circuit diagram of a pixel PX according to an exemplary embodiment.

Referring to FIG. 3, the display panel DP may include a display region DA and a non-display region NDA, when viewed in a plan view. The display region DA and the non-display region NDA of the display panel DP may correspond to the display region DD-DA and the non-display region DD-NDA, respectively, of the display device DD illustrated in FIG. 1A. In certain embodiments, the display and non-display regions DA and NDA of the display panel DP may not be the same as the display and non-display regions DD-DA and DD-NDA of the display device DD and may be changed according to the structure or design of the display panel DP.

The display panel DP may include a plurality of signal lines SGL and a plurality of pixels PX. A region, on which the plurality of pixels PX are provided, may be defined as the display region DA. In the present embodiment, the non-display region NDA may be defined along an edge or circumference of the display region DA surrounding the display region DA.

The plurality of signal lines SGL may include gate lines GL, data lines DL, a power line PL, and a control signal line CSL. Each of the gate lines GL may be electrically connected to corresponding ones of the plurality of pixels PX, and each of the data lines DL may be electrically connected to corresponding ones of the plurality of pixels PX. The power line PL may be electrically connected to the plurality of pixels PX. A gate driving circuit DCV, to which the gate lines GL are electrically connected, may be provided at a side region of the non-display region NDA. The control signal line CSL may be used to provide control signals to the gate driving circuit DCV.

Some of the gate lines GL, the data lines DL, the power line PL, and the control signal line CSL may be provided at the same layer, and at least one of them may be provided at a different layer from that of the others. Among the gate lines GL, the data lines DL, the power line PL, and the control signal line CSL, signal lines provided at a first layer may be defined as a first signal line, and signal lines provided at a second layer may be defined as a second signal line. Furthermore, signal lines provided at a third layer may be defined as a third signal line.

Each of the gate lines GL, the data lines DL, the power line PL, and the control signal line CSL may include a signal line portion and a display panel pad PD-DP electrically connected to an distal end of the signal line portion. The signal line portion may be defined as the portion of the gate lines GL, the data lines DL, the power line PL, and the control signal line CSL, except for the display panel pad PD-DP thereof.

The display panel pads PD-DP may be formed in the same process as that for forming the transistors for driving the pixels. For example, the process of fabricating the display panel pads PD-DP may include the LTPS and/or LTPO process.

In exemplary embodiments, the display panel pads PD-DP may include a control pad CSL-P, a data pad DL-P, and a power pad PL-P. Although a gate pad is not illustrated, it may be provided to be overlapped with the gate driving circuit DCV and to provide a signal path to the gate driving circuit DCV. Although not indicated by a separate reference number, a portion of the non-display region NDA, in which the control pad CSL-P, the data pad DL-P, and the power pad PL-P are arranged, may be referred to as a pad region.

FIG. 4 exemplarily illustrates one of the pixels PX that is electrically connected to one of the gate lines GL, one of the data lines DL, and the power line PL. However, the exemplary embodiments are not limited thereto, and the structure of the pixel PX may be variously changed.

The pixel PX may include a light-emitting device LM, which may serve as a display element. The light-emitting device LM may be a top-emission type diode or a bottom-emission type diode. In certain embodiments, the light-emitting device LM may be a double-sided emission type diode. The light-emitting device LM may be an organic light emitting diode (OLED). The pixel PX may include a switching transistor TFT-S and a driving transistor TFT-D, which are used to control operations of the light-emitting device LM, and a capacitor CP. The light-emitting device LM may generate light in response to electrical signals transmitted from the transistors TFT-S and TFT-D.

The switching transistor TFT-S may be configured to output a data signal applied to the data line DL, in response to a scan signal applied to the gate line GL. The capacitor CP may be charged to a voltage level corresponding to the data signal transmitted through the switching transistor TFT-S.

The driving transistor TFT-D may be electrically connected to the light-emitting device LM. The driving transistor TFT-D may control a driving current passing through the light-emitting device LM, based on an amount of electric charges stored in the capacitor CP. The light-emitting device LM may emit light, when the driving transistor TFT-D is in a turned-on state.

The power line PL may be used to supply a first power voltage VDD1 to the light-emitting device LM.

Figure 5:
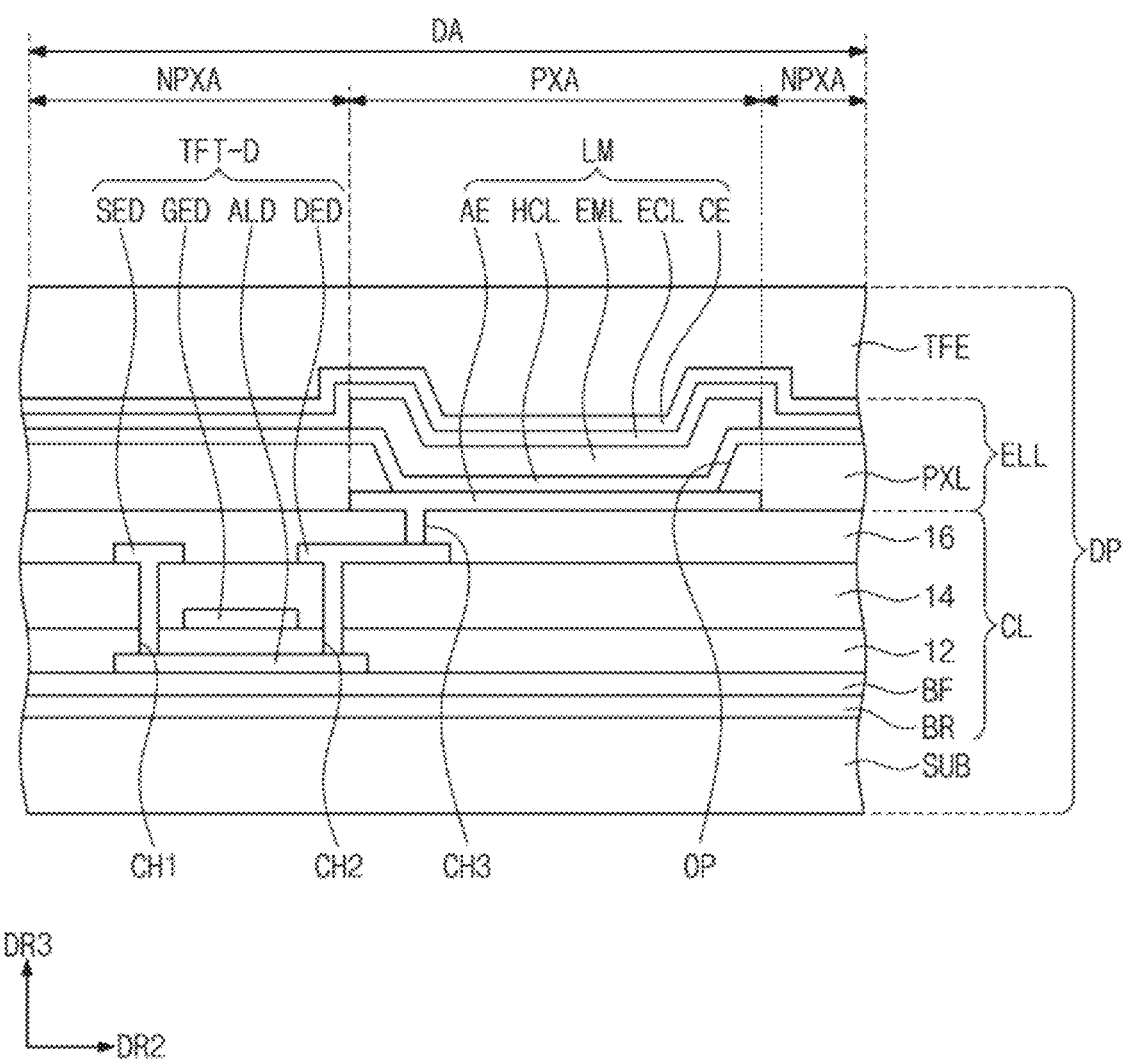
FIG. 5 is a sectional view illustrating a portion of a pixel according to an exemplary embodiment.

FIG. 5 is a sectional view illustrating a portion of the pixel PX according to an exemplary embodiment. FIG. 5 is a sectional view of a region, in which the driving TFT-D and the light-emitting device LM shown in FIG. 4 are provided.

As shown in FIG. 5, a circuit layer CL may be provided on a substrate SUB. The substrate SUB may include the display region DA and the non-display region NDA as previously described with reference to FIG. 1A. However, for convenience in illustration, only the display region DA of the substrate SUB is illustrated in FIG. 5. The driving transistor TFT-D may include a semiconductor pattern ALD that is provided on the substrate SUB. The semiconductor pattern ALD may include at least one of amorphous silicon, poly silicon, and/or metal oxide semiconductor materials.

The circuit layer CL may include organic/inorganic layers BR, BF, 12, 14, and 16, in addition to the switching transistor TFT-S and the driving transistor TFT-D as described with reference to FIG. 4. The organic/inorganic layers BR, BF, 12, 14, and 16 may include functional layers BR and BF, a first insulating layer 12, a second insulating layer 14, and a third insulating layer 16.

The functional layers BR and BF may be provided on a surface of the substrate SUB. The functional layers BR and BF may include at least one of a barrier layer BR and/or a buffer layer BF. The semiconductor pattern ALD may be placed on the barrier layer BR and/or on the buffer layer BF.

The first insulating layer 12 may be provided on the substrate SUB to cover the semiconductor pattern ALD. The first insulating layer 12 may include an organic layer and/or an inorganic layer. In certain embodiments, the first insulating layer 12 may include a plurality of inorganic thin-films. The plurality of inorganic thin-films may include a silicon nitride layer and a silicon oxide layer.

The driving transistor TFT-D may include a control electrode GED that is provided on the first insulating layer 12. Although not shown, the switching transistor TFT-S may also include a control electrode that is provided on the first insulating layer 12. The control electrode GED and the gate line GL (e.g., see FIG. 4) may be formed using the same photolithography process. In other words, the control electrode GED may be formed of the same material as the gate lines GL, and the control electrode GED and the gate lines GL may have the same stacking structure and may be provided at the same level.

The second insulating layer 14 may be provided on the first insulating layer 12 to cover the control electrode GED. The second insulating layer 14 may include an organic layer and/or an inorganic layer. In certain embodiments, the second insulating layer 14 may include a plurality of inorganic thin-films. The plurality of inorganic thin-films may include a silicon nitride layer and a silicon oxide layer.

The data line DL (e.g., see FIG. 4) may be provided on the second insulating layer 14. The driving transistor TFT-D may include an input electrode SED and an output electrode DED that are provided on the second insulating layer 14. Although not shown, the switching transistor TFT-S may also include an input electrode and an output electrode that are provided on the second insulating layer 14. The input electrode of the switching transistor TFT-S (e.g., see FIG. 4) may be a portion that is branched off from a corresponding one of the data lines DL. The power line PL (e.g., see FIG. 4) may be provided on the second insulating layer 14. The input electrode SED of the driving transistor TFT-D may be branched off from the power line PL.

A portion of an electrode of the capacitor CP (e.g., see FIG. 4) may be provided on the second insulating layer 14. The portion of the electrode of the capacitor CP may be formed using the same photolithography process as that for the data lines DL and the power line PL. In this case, the portion of the electrode of the capacitor CP, the data lines DL, and the power line PL may be formed of the same material and at the same level and may have the same stacking structure.

The input electrode SED and the output electrode DED may be electrically connected to respective portions of the semiconductor pattern ALD through a first through hole CH1 and a second through hole CH2, which are formed to penetrate both of the first insulating layer 12 and the second insulating layer 14 to expose at least a part of the respective portions of the semiconductor pattern ALD. In certain embodiments, the switching transistor TFT-S and the driving transistor TFT-D may be configured to have a bottom gate structure.

The third insulating layer 16 may be provided on the second insulating layer 14 to cover the input electrode SED and the output electrode DED. The third insulating layer 16 may include an organic layer and/or an inorganic layer. In particular, the third insulating layer 16 may comprise an organic material to provide a flat top surface.

According to a circuit structure of the pixel, it may be possible to omit one of the first insulating layer 12, the second insulating layer 14, and the third insulating layer 16. Each of the first insulating layer 12, the second insulating layer 14 and the third insulating layer 16 may be defined as an interlayered insulating layer. The interlayered insulating layer may be provided between vertically-separated conductive patterns and may be used to electrically disconnect the conductive patterns from each other.

A device layer ELL may be provided on the third insulating layer 16. The device layer ELL may include a pixel definition layer PXL and the light-emitting device LM. An anode AE may be provided on the third insulating layer 16. The anode AE may be electrically connected to the output electrode DED of the driving transistor TFT-D through a third through hole CH3, which is formed to penetrate the third insulating layer 16 to expose at least a part of the output electrode DED of the driving transistor TFT-D. An opening OP may be defined in the pixel definition layer PXL. The opening OP of the pixel definition layer PXL may expose a at least a part of the anode AE.

The device layer ELL may include a light-emitting region PXA and a non-light-emitting region NPXA adjacent to the light-emitting region PXA. The non-light-emitting region NPXA may be provided to surround the light-emitting region PXA. In the present embodiment, the light-emitting region PXA may be defined to correspond to the anode AE. However, the structure or position of the light-emitting region PXA is not limited thereto. For example, the light-emitting region PXA may be defined as a region, from which light is emitted. In certain embodiments, the light-emitting region PXA may be defined to correspond to the portion of the anode AE exposed by the opening OP.

A hole control layer HCL may be provided in common on the light-emitting region PXA and the non-light-emitting region NPXA. Although not shown, a common layer, such as the hole control layer HCL, may be commonly provided in a plurality of the pixels PX (e.g., see FIG. 3).

A light emitting layer EML may be provided on the hole control layer HCL. The light emitting layer EML may be locally provided on only a region corresponding to the opening OP. In other words, the light emitting layer EML may be divided into a plurality of patterns that are formed in the plurality of pixels PX, respectively.

The light emitting layer EML may include an organic material and/or an inorganic material.

An electron control layer ECL may be provided on the light emitting layer EML. A cathode CE may be provided on the electron control layer ECL. The cathode CE may be commonly placed on the plurality of pixels PX.

In the present embodiment, the light emitting layer EML is illustrated to have a patterned structure; however, in certain embodiments, the light emitting layer EML may be provided as a common layer to span across the plurality of pixels PX. In this case, the light emitting layer EML may be configured to emit a white-color light. In certain embodiments, the light emitting layer EML may be provided to have a multi-layered structure.

In the present embodiment, an encapsulation layer TFE may be provided to directly cover the cathode CE. In certain embodiments, a capping layer may be further provided between the cathode CE and the encapsulation layer TFE to cover the cathode CE. In this case, the encapsulation layer TFE may be provided to directly cover the capping layer. The encapsulation layer TFE may include at least one of organic layers and inorganic layers.

Figure 6:
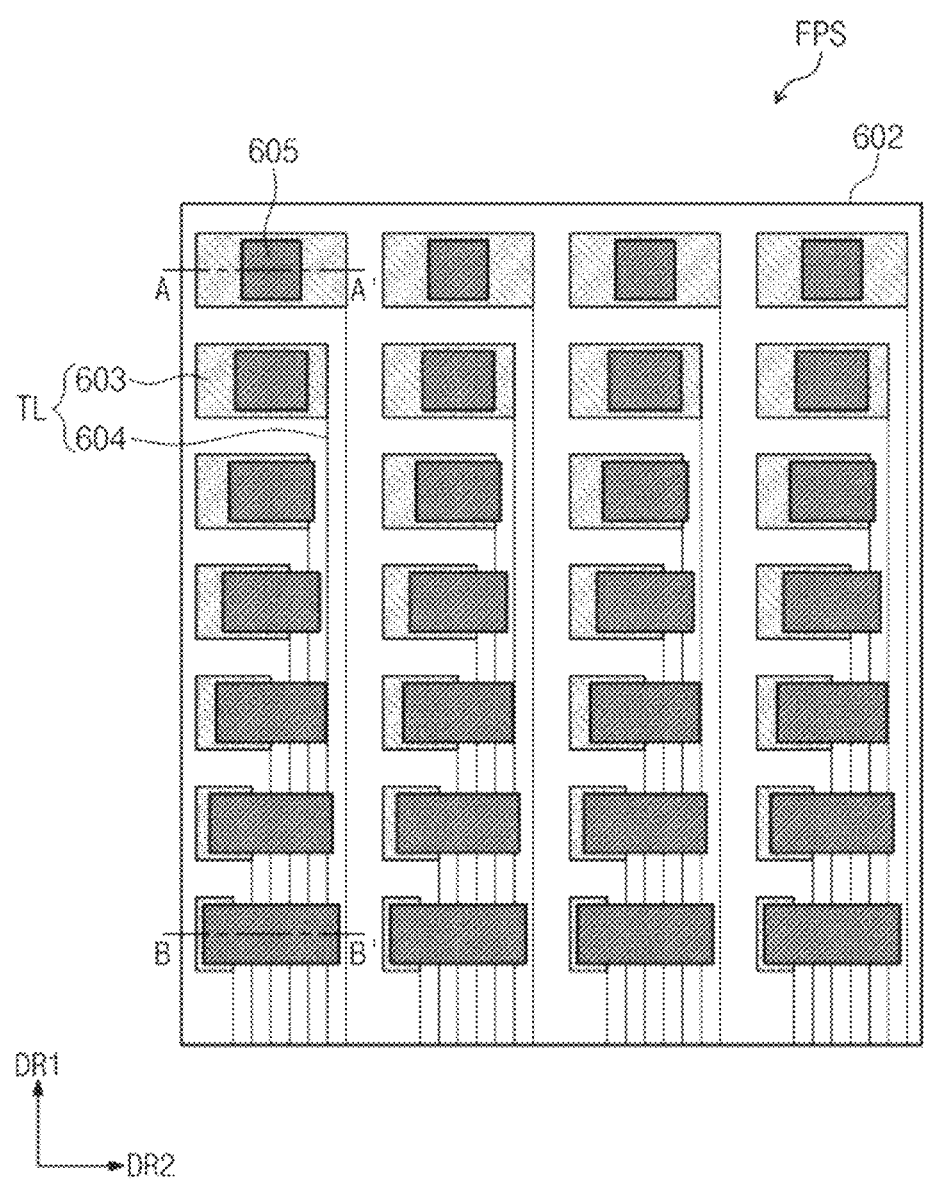
FIG. 6 is a plan view illustrating a touch layer according to an exemplary embodiment.
Figure 7A:
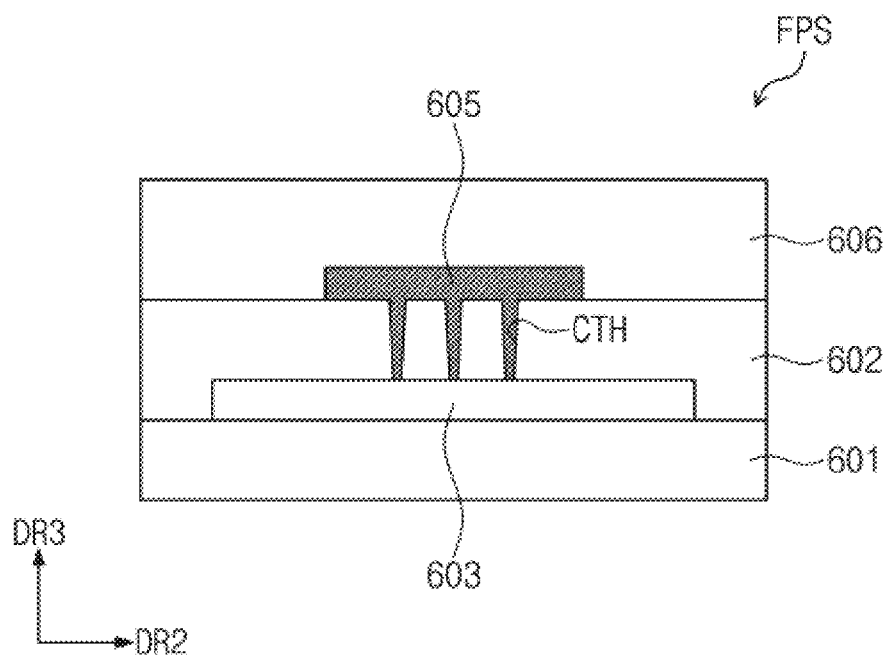
FIG. 7A is an enlarged section view taken along a first sectional line A-A' of FIG. 6.
Figure 7B:
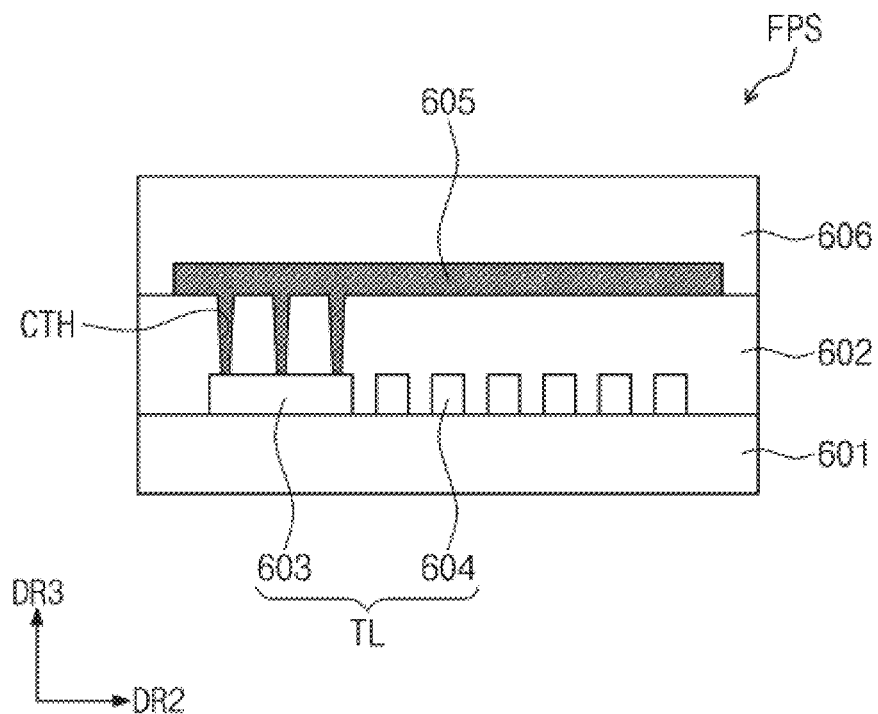
FIG. 7B is an enlarged section view taken along a second sectional line B-B' of FIG. 6.
Figure 8:
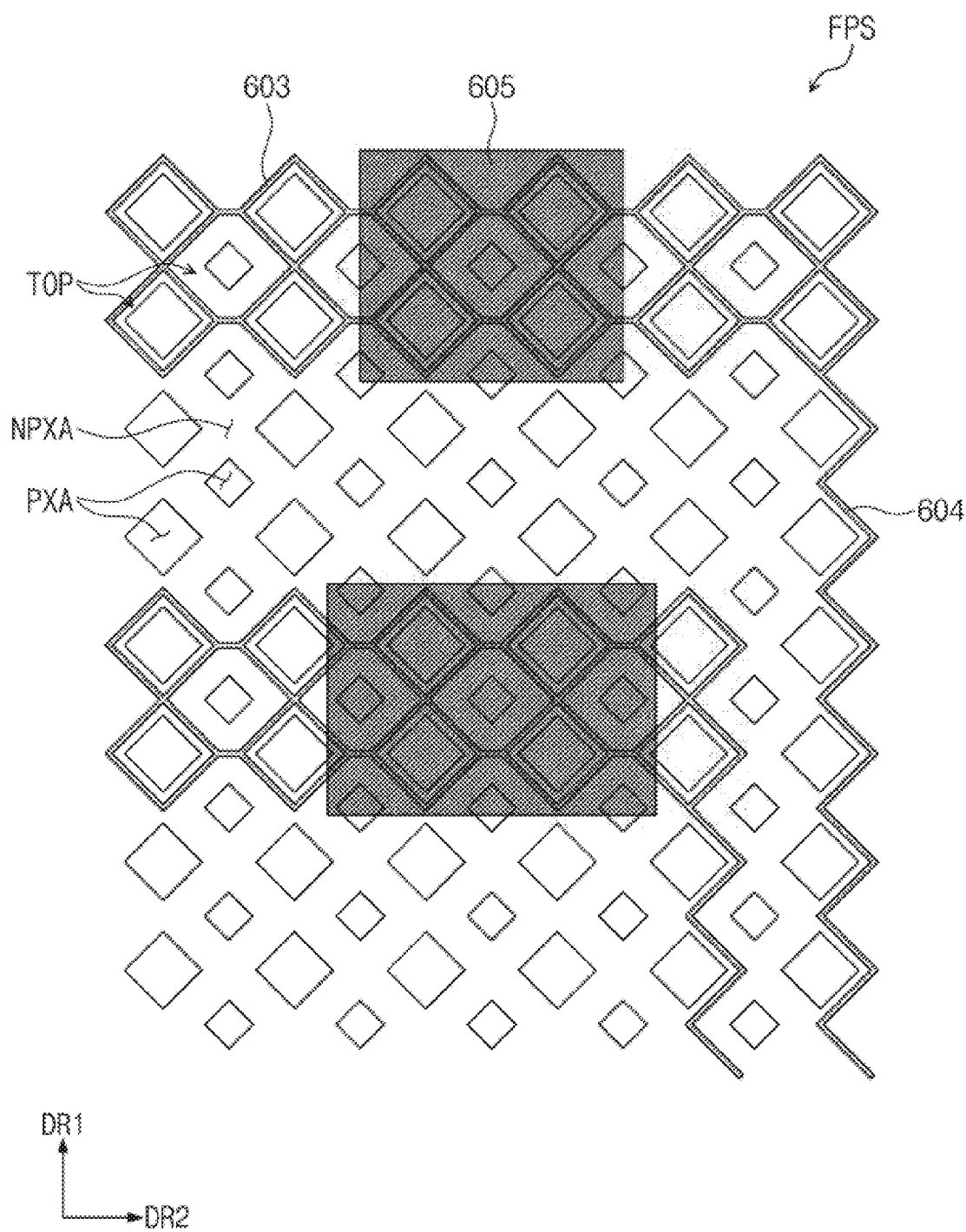
FIG. 8 is a plan view illustrating a detailed structure of the touch layer of FIG. 6.

FIG. 6 is a plan view illustrating the touch layer FPS according to an exemplary embodiment. FIG. 7A is an enlarged section view taken along a first sectional line A-A' of FIG. 6. FIG. 7B is an enlarged section view taken along a second sectional line B-B' of FIG. 6. FIG. 8 is a plan view illustrating a detailed structure of the touch layer FPS of FIG. 6.

Referring to FIGS. 6, 7A, 7B, and 8, the touch layer FPS may include a base substrate 601, a plurality of touch patterns TL, an insulating layer 602, a plurality of touch electrodes 605, and a planarization layer 606.

The base substrate 601 may include an inorganic material. The base substrate 601 may be provided in the form of a thin plate. The exemplary embodiments are not limited to a material of the base substrate 601. In exemplary embodiments, the base substrate 601 may include at least one of silicon nitride, silicon oxynitride, and/or silicon oxide. The base substrate 601 may be an encapsulation layer constituting the display panel DP of FIG. 5 or an additional substrate attached to the display panel DP.

The touch pattern TL may be placed on the base substrate 601. The touch pattern TL may include a metallic material. For example, the touch pattern TL may include at least one of low resistivity metals including copper (Cu), aluminum (Al), molybdenum (Mo), titanium (Ti), silver (Ag), gold (Au), nickel (Ni), chromium (Cr), iron (Fe), indium (In), and gallium (Ga).

Touch patterns TL may include second sub-patterns 603 and first sub-patterns 604. One touch pattern may include one first sub pattern and one second sub pattern. When viewed in a plan view, each of the first sub-patterns 604 may extend in the first direction DR1 and may be a linear shape. In exemplary embodiments, the first sub-patterns 604 may be arranged in the second direction DR2.

The second sub-patterns 603 may extend from the first sub-patterns 604, when viewed in a plan view. In more detail, when viewed in a plan view, the second sub-pattern 603 may extend from the first sub-patterns 604 in a direction crossing the first direction DR1. For example, the second sub-patterns 603 may extend from the first sub-patterns 604 in the second direction DR2. In exemplary embodiments, the second direction DR2 may be perpendicular to the first direction DR1. The second sub-patterns 603 and the first sub-patterns 604 may be connected to form a single body. Although not illustrated in the drawings, the display device DD (e.g., see FIG. 1A) may further include a touch driving part (not shown), which is configured to generate touch driving signals for driving the touch patterns TL, respectively. The first sub-patterns 604 may be used to transmit the touch driving signal to the second sub-patterns 603 from the touch driving part.

Referring to FIG. 8, the touch pattern TL may be overlapped with the non-light-emitting region NPXA. When viewed in a plan view, as shown in FIG. 8, the first sub-patterns 604 may include linear patterns that are arranged along the non-light-emitting region NPXA and are connected to each other. In detail, the first sub-patterns 604 may include diagonal patterns, which are connected to each other to form a specific angle, and may extend in the first direction DR1.

The second sub-patterns 603 may have a mesh shape enclosing some of the light-emitting regions PXA and may extend from the first sub-patterns 604 in the second direction DR2. In detail, the second sub-patterns 603 may have a diamond shape enclosing some of the light-emitting regions PXA and may extend from the first sub-patterns 604.

The touch pattern TL may be provided to have a line width of several micrometers.

The light-emitting regions PXA may have two or more sizes. For example, among the light-emitting regions PXA, the light-emitting regions PXA, which are configured to emit blue and red lights, respectively, may have different sizes from each other. Accordingly, openings TOP formed by the second sub-patterns 603 may also have various sizes. FIG. 8 illustrates an example, in which the light-emitting regions PXA having various sizes are provided, but the exemplary embodiments are not limited thereto. For example, in certain embodiments, the light-emitting regions PXA may be formed to have the same size. The openings TOP formed by the second sub-patterns 603 may also have the same size.

Referring to FIGS. 6, 7A, and 7B, the insulating layer 602 may be provided on the touch pattern TL. The insulating layer 602 may include an inorganic insulating material or an organic insulating material. In detail, the inorganic insulating material may include at least one of aluminum oxide, titanium oxide, silicon oxide, silicon nitride, silicon oxynitride, zirconium oxide, and/or hafnium oxide. The organic insulating material may include at least one of acrylic resins, methacryl resins, polyisoprene resins, vinyl resins, epoxy resins, urethane resins, cellulose resins, siloxane resins, polyimide resins, polyamide resins, and/or perylene resins. In exemplary embodiments, the insulating layer 602 may be provided to have a multi-layered structure including at least two different materials.

The plurality of touch electrodes 605 may be placed on the insulating layer 602. Each of the touch electrodes 605 may be a transparent electrode. In exemplary embodiments, each of the touch electrodes 605 may include at least one of indium tin oxide (ITO), indium zinc oxide (IZO), zinc oxide (ZnO), and/or indium tin zinc oxide (ITZO). In exemplary embodiments, the touch electrodes 605 may have a thickness of 300 □ or less.

A plurality of contact holes CTH may be formed in the insulating layer 602. Each of the contact holes CTH may be formed to penetrate the insulating layer 602 and expose at least a part of a corresponding one of the touch patterns TL. Each of the touch electrodes 605 may be electrically connected to the touch pattern TL through the contact holes CTH. In detail, each of the contact holes CTH may be used to electrically connect a corresponding one of the touch electrodes 605 to the second sub-patterns 603 and the first sub-patterns 604. The touch electrodes 605 may be capacitively coupled with an external object (e.g., the finger FG shown in FIG. 1B), and in this case, the electrostatic capacitance of the touch electrodes 605 may be changed. By measuring the change in the electrostatic capacitance through the touch electrodes 605, it may be possible to sense an input caused by the external object.

As described above, in a self-capacitance based touch sensing method, the touch electrodes 605 may be electrically connected to the second sub-patterns 603 having a mesh shape through the contact holes CTH, and thus, it may be possible to increase an area, through which a touch event from an external object can be sensed. Furthermore, in this case, since the electrostatic capacitance between the touch electrodes 605 and the external object is increased, it may be possible to improve touch sensitivity of a display device.

Referring to FIG. 6, a planar area of the second sub-patterns 603 may gradually increase in the first direction DR1. This may be because an occupation area of the first sub-patterns 604 increases in a direction opposite to the first direction DR1.

On the other hand, a planar area of each of the touch electrodes 605 may gradually decrease in the first direction DR1. In exemplary embodiments, an area of the touch electrode of FIG. 7A may be smaller than an area of the touch electrode of FIG. 7B. Thus, when viewed in a plan view, on the second sub-patterns 603 having a relatively large area, the touch electrode 605 may be provided to have a small area and to be overlapped with the second sub-patterns 603 having the large area, whereas on the second sub-patterns 603 having a relatively small area, the touch electrode 605 may be provided to have a large area and be overlapped with the second sub-patterns 603 having a small area. This arrangement of the touch electrode 605 may reduce a positional variation of the electrostatic capacitance in the first direction DR1, and thereby may increase the consistency of the touch sensitivity of a display device, regardless of a position of a touch event.

The planarization layer 606 may be placed on the touch electrodes 605. The planarization layer 606 may include an organic material and may be formed to have a flat top surface. In exemplary embodiments, the planarization layer 606 may include an organic material (e.g., polyimide).

However, the exemplary embodiments are not limited to the above-described structure of the touch pattern TL and the touch electrodes 605, and in certain embodiments, although not illustrated in the drawings, the second sub-patterns 603 may not be connected to the touch electrode 605 through the contact hole CTH, and the touch electrode 605 may be formed to be in direct contact with the second sub-patterns 603. In this case, the insulating layer 602 may be omitted.

In certain embodiments, the second sub-patterns 603 may be provided on the touch electrodes 605, respectively. In this case, the second sub-patterns 603 may be in contact with the top surface of the touch electrode 605 and may be electrically connected to the touch electrode 605.

Figure 9:
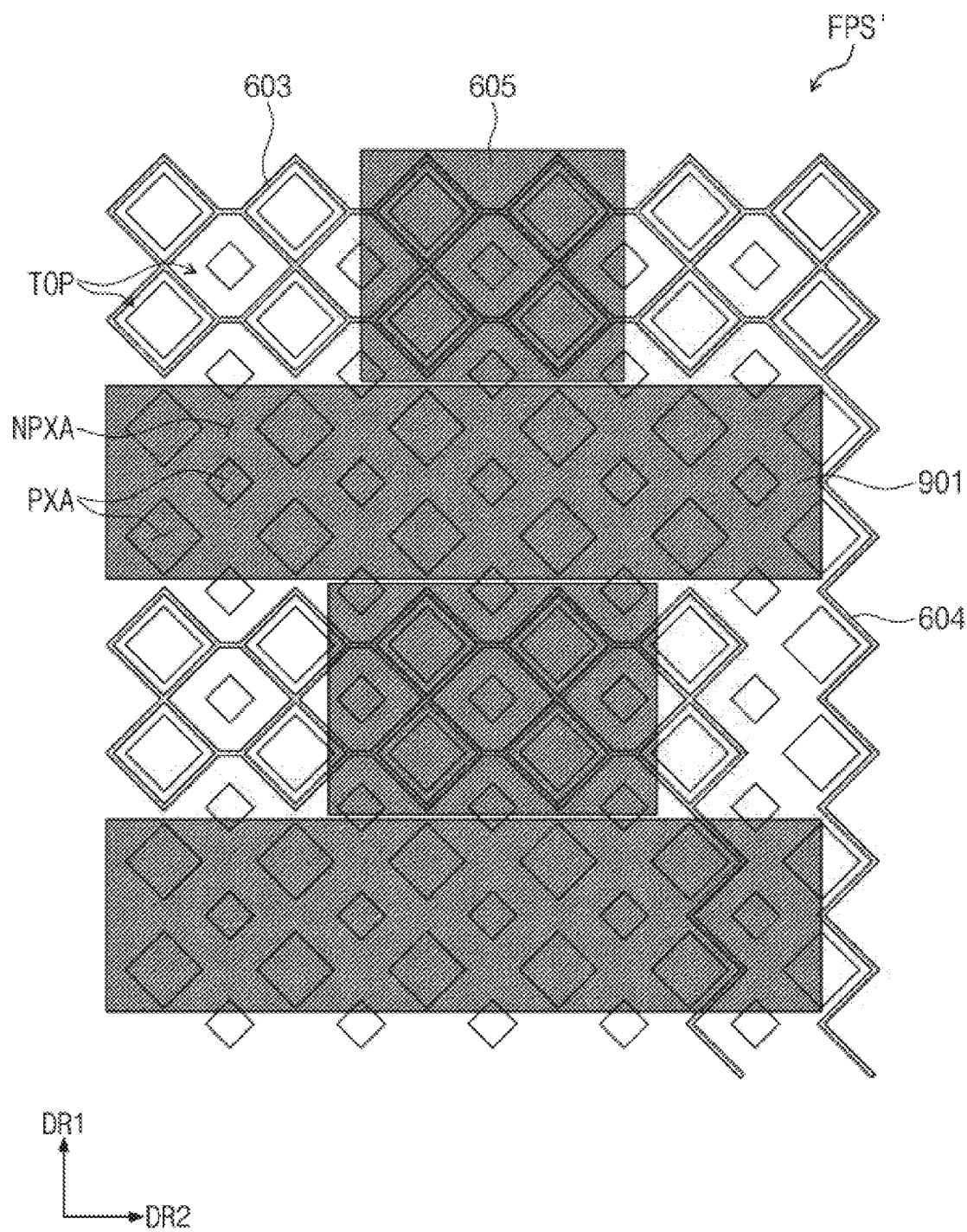
FIG. 9 is a plan view illustrating a detailed structure of a touch layer according to an exemplary embodiment.

FIG. 9 is a plan view illustrating a detailed structure of a touch layer FPS' according to an exemplary embodiment.

In the following description of FIG. 9, a previously described element may be identified by a similar or identical reference number without repeating an overlapping description thereof, for the sake of brevity.

The touch layer FPS' of FIG. 9 may further include a plurality of dummy electrodes 901, compared with the touch layer FPS described with reference to FIG. 8.

The dummy electrodes 901 may be provided between two adjacent touch electrodes of the touch electrodes 605. The dummy electrodes 901 may be provided on the insulating layer 602 (e.g., see FIG. 7A) to be spaced apart from the touch electrodes 605. The dummy electrodes 901 may be provided on the same layer as that of the touch electrodes 605. In more detail, the dummy electrodes 901 may be provided on a region of the insulating layer 602 that is not overlapped with the touch electrodes 605. The dummy electrodes 901 may include the same material as the touch electrodes 605. In exemplary embodiments, the dummy electrodes 901 may include at least one of indium tin oxide (ITO), indium zinc oxide (IZO), zinc oxide (ZnO), and/or indium tin zinc oxide (ITZO).

The dummy electrodes 901 may be electrically disconnected from the touch pattern TL (e.g., see FIG. 7A), unlike the touch electrodes 605. Thus, the dummy electrodes 901 may not receive the touch driving signal from a touch driving part.

Since the dummy electrodes 901 formed of the same material as the touch electrodes 605 are provided to be spaced apart from or not overlapped with the touch electrodes 605, it may reduce variations in transmittance of an external light, which may be caused by the touch electrodes 605.

Figure 10:
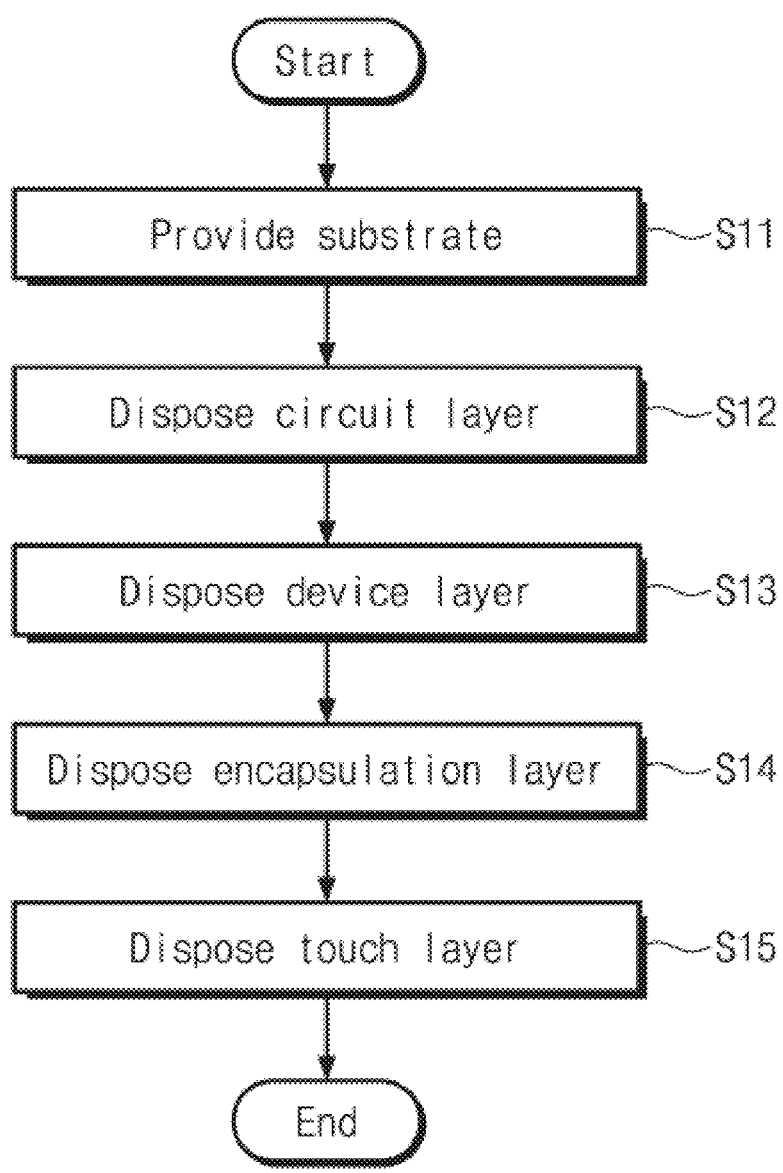
FIG. 10 is a flow chart illustrating a method of fabricating a display device, according to an exemplary embodiment.
Figure 11:
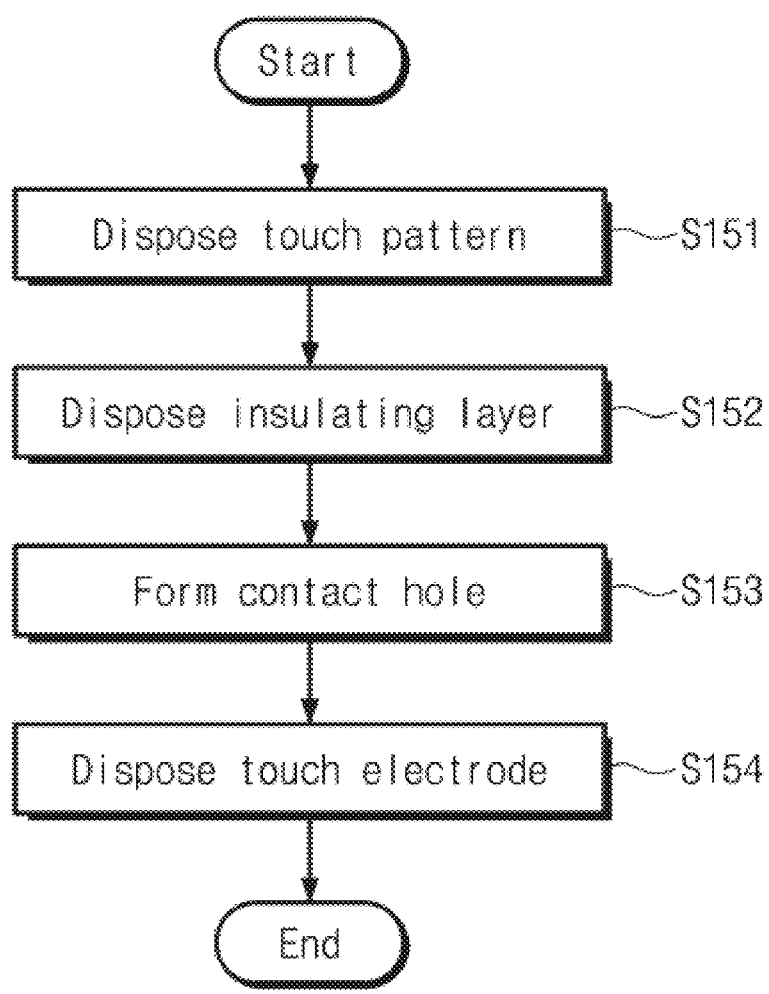
FIG. 11 is a flow chart illustrating a process of forming a touch layer according to an exemplary embodiment.

FIG. 10 is a flow chart illustrating a method of fabricating the display device DD (e.g., of FIG. 1A), according to an exemplary embodiment. FIG. 11 is a flow chart illustrating a process of forming the touch layer FPS (e.g., of FIG. 7A), according to an exemplary embodiment.

Referring to FIGS. 5 and 10, the substrate SUB may be provided (S11), and the circuit layer CL may be formed or disposed on the substrate SUB (S12). The circuit layer CL may be formed or disposed to have the same features as those described with reference to FIG. 5. The device layer ELL may be formed or disposed on the circuit layer CL (S13). As described above, the device layer ELL may include the light-emitting region PXA and the non-light-emitting region NPXA adjacent thereto. The device layer ELL may be formed or disposed to have the same features as those described with reference to.

The encapsulation layer TFE may be formed or disposed on the device layer ELL (S14). The encapsulation layer TFE may be formed or disposed to have the same features as those described with reference to FIG. 5.

Referring to FIGS. 6 and 10, after the formation of the encapsulation layer TFE, the touch layer FPS may be formed or disposed on the encapsulation layer TFE (S15).

Hereinafter, a process of forming the touch layer FPS will be described in more detail with reference to FIG. 11, but for concise description, a previously described element may be identified by a similar or identical reference number without repeating an overlapping description thereof.

Referring to FIGS. 6, 7A, and 11, the touch pattern TL may be formed or disposed on the base substrate 601 (S151). The formation of the touch pattern TL may include forming or disposing a metal layer on the base substrate 601 and patterning the metal layer using a photolithography process. The metal layer may include at least one of metallic materials including low resistivity metals, such as copper (Cu), aluminum (Al), molybdenum (Mo), titanium (Ti), silver (Ag), gold (Au), nickel (Ni), chromium (Cr), iron (Fe), indium (In), and gallium (Ga). The first sub-patterns 604 and the second sub-patterns 603 may be formed or disposed at the same time through a single process.

After the formation of the touch pattern TL, the insulating layer 602 may be formed or disposed to cover the touch pattern TL (S152). The insulating layer 602 may include an inorganic insulating material.

After the formation of the insulating layer 602, the contact hole CTH may be formed or disposed in the insulating layer 602 (S153). The contact hole CTH may be formed by a patterning process including a photolithography process.

The touch electrodes 605 described above may be formed or disposed on the insulating layer 602 (S154). The formation of the touch electrodes 605 may include forming or disposing a layer, which is formed of or includes at least one of indium tin oxide (ITO), indium zinc oxide (IZO), zinc oxide (ZnO), and/or indium tin zinc oxide (ITZO), on the insulating layer 602, and then patterning the layer using a photolithography process. In more detail, the formation of the touch electrodes 605 may include forming or disposing an amorphous ITO layer or an amorphous IZO layer on the insulating layer 602 and patterning the amorphous ITO or IZO layer using a photolithography process. In exemplary embodiments, the touch electrodes 605 may include amorphous IZO.

As a result of the patterning process, the touch electrodes 605 may be electrically connected to the touch pattern TL through the contact hole CTH.

The planarization layer 606 may be formed or disposed on the touch electrodes 605, and thus, the touch layer FPS may be formed.

In a self-capacitance based touch sensing method, touch electrodes may be electrically connected to second sub-patterns having a mesh shape through contact holes, and thus, it may be possible to increase an area of a region that can be used to sense a touch event from an external object. Furthermore, in this case, since the electrostatic capacitance between the touch electrodes and the external object is increased, it may be possible to improve touch sensitivity of a display device.

In addition, when viewed in a plan view, on the second sub-patterns having a relatively large area, the touch electrode may be provided to have a small area and to be overlapped with the second sub-patterns having the large area, and on the second sub-patterns having a relatively small area, the touch electrode may be provided to have a large area and to be overlapped with the second sub-patterns having the small area. This arrangement of the touch electrode may reduce a positional variation of the electrostatic capacitance in a direction, and thereby may increase the consistency of the touch sensitivity of a display device, regardless of a position of a touch event.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device, comprising:
   a display panel including a display region defined therein; and
   an input sensing layer disposed on the display panel, the input sensing layer comprising:
     a first sensing electrode comprising a first sub-electrode and a second sub-electrode disposed on the first sub-electrode;
     a second sensing electrode spaced apart from the first sensing electrode in a first direction, the second sensing electrode comprising a third sub-electrode and a fourth sub-electrode disposed on the third sub-electrode;
     a first sensing wire electrically connected to the first sensing electrode; and
     a second sensing wire electrically connected to the second sensing electrode,
   wherein a width of the first sub-electrode in a second direction intersecting with the first direction is greater than a width of the third sub-electrode in the second direction, and
   wherein a width of the second sub-electrode in the second direction is smaller than a width of the fourth sub-electrode in the second direction.

2. The display device of claim 1, an area of a region where the first sub-electrode is disposed is greater than an area of a region where the second sub-electrode is disposed in a plan view.

3. The display device of claim 1, an area of a region where the third sub-electrode is disposed is smaller than an area of a region where the fourth sub-electrode is disposed in a plan view.

4. The display device of claim 1, wherein the fourth sub-electrode overlaps with at least a portion of the first sensing wire in a plan view.

5. The display device of claim 1, wherein a length of the first sensing wire in the first direction is longer than a length of the second sensing wire in the first direction.

6. The display device of claim 1, at least a portion of the first sensing wire and at least a portion of the second sensing wire overlap with the display region in a plan view.

7. The display device of claim 1, wherein the first sub-electrode and the third sub-electrode are directly disposed on the display panel.

8. The display device of claim 1, wherein the first sub-electrode and the third sub-electrode have a mesh shape.

9. The display device of claim 1, wherein the display panel comprises a substrate, a circuit layer disposed on the substrate, a device layer disposed on the circuit layer, and an encapsulation layer disposed on the device layer, and
   wherein the first sub-electrode and the third sub-electrode are directly disposed on the encapsulation layer.

10. The display device of claim 1, wherein the first sensing electrode and the second sensing electrode are disposed on the display region.

11. The display device of claim 1, wherein the second sub-electrode and the fourth sub-electrode are transparent electrodes.

12. The display device of claim 1, wherein an area of a region where the first sub-electrode is disposed is greater than an area of a region where the third sub-electrode is disposed in a plan view, and
   wherein an area of a region where the second sub-electrode is disposed is smaller than an area of a region where the fourth sub-electrode is disposed in the plan view.

* * * * *